United States Patent [19]  
Engler et al.

[11] Patent Number: 4,987,112  
[45] Date of Patent: Jan. 22, 1991

[54] CATALYST TO ELIMINATE NOXIOUS SUBSTANCES CONTAINED IN THE EXHAUST GASES OF PREDOMINANTLY ALCOHOL FUELED INTERNAL COMBUSTION ENGINES, A PROCESS FOR ITS PREPARATION, AND USES

[75] Inventors: Bernd Engler, Hanau; Edgar Koberstein, Alzenau; Egbert Lox, Hanau; Herbert Voelker, Zeiskam, all of Fed. Rep. of Germany

[73] Assignee: Degussa Aktiengesellschaft, Frankfurt am Main, Fed. Rep. of Germany

[21] Appl. No.: 404,949

[22] Filed: Sep. 5, 1989

[30] Foreign Application Priority Data

Sep. 7, 1988 [DE] Fed. Rep. of Germany ....... 3830317

[51] Int. Cl.$^5$ .................. B01J 21/04; B01J 21/06; B01J 23/28
[52] U.S. Cl. .................................. 502/255; 502/258; 502/263; 502/303; 502/314; 502/322; 502/527
[58] Field of Search ............... 502/235, 238, 255, 263, 502/304, 303, 302, 527, 322, 258

[56] References Cited

U.S. PATENT DOCUMENTS 3,867,312 2/1975 Stephens ............................ 502/304  
3,878,130 4/1975 Michel et al. ..................... 423/213.5  
3,941,903 3/1976 Tucker, Jr. ......................... 427/190  
4,332,909 6/1982 Nishida et al. ....................... 501/88

FOREIGN PATENT DOCUMENTS 2005149A 4/1979 United Kingdom ............... 502/439  
2036585A 7/1980 United Kingdom ............... 502/439

OTHER PUBLICATIONS

Applied Catalysis, 34 (1987), Elsevier Science Publishers B. V., Amsterdam, p. 225.  
Applied Catalysis, 34 (1987), Elsevier Science Publishers, B. V., Amsterdam, p. 239.

Primary Examiner—Anthony McFarlane

[57] ABSTRACT

A catalyst support for detoxifying the exhaust gases of alcohol fueled internal combustion engines contains, besides rare earth metal oxides and palladium, molybdenum silicide on active aluminum oxide in order to improve the conversion of noxious substances and the start up behavior.

17 Claims, 10 Drawing Sheets

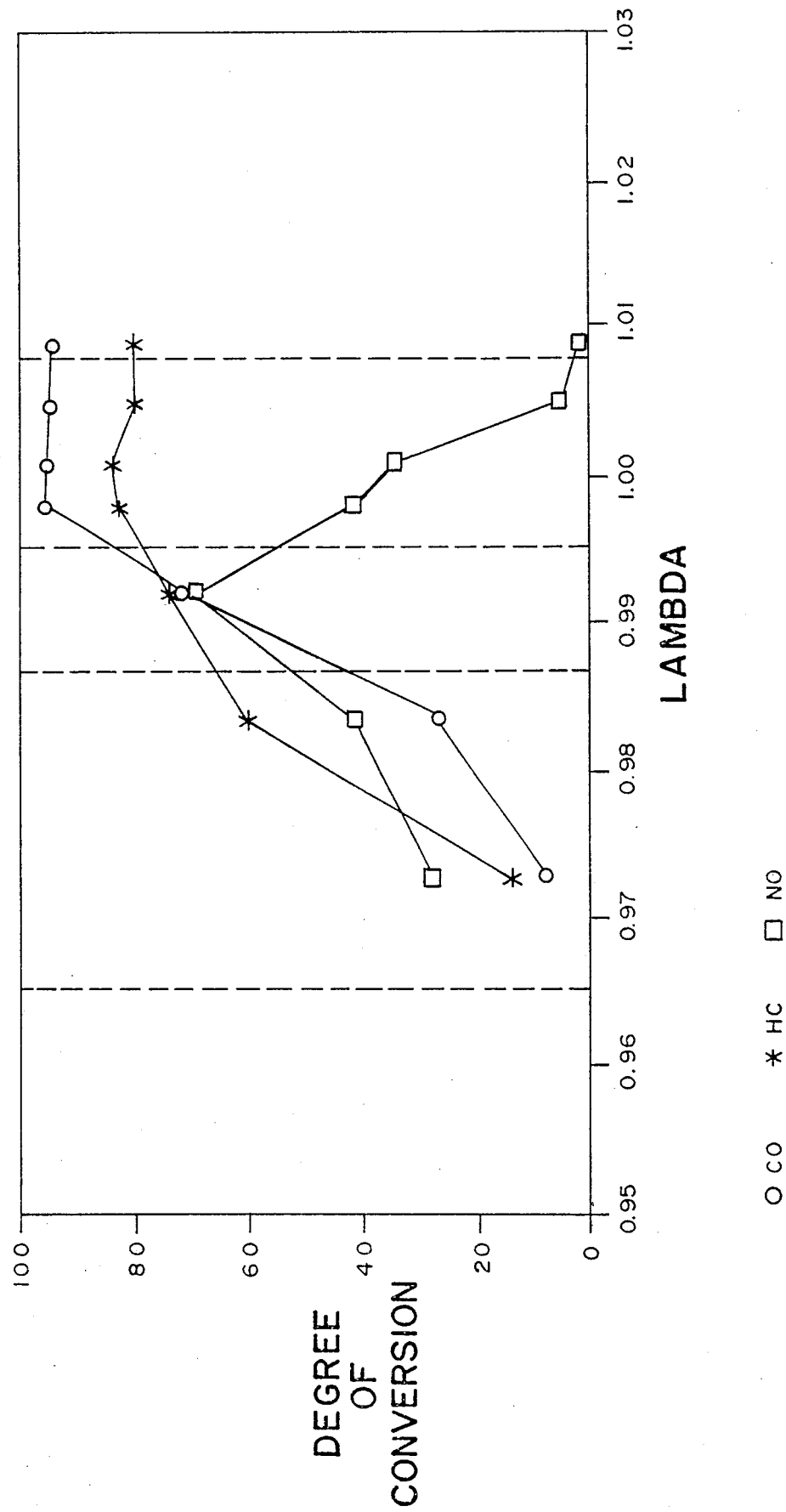

CATALYST TO ELIMINATE NOXIOUS SUBSTANCES CONTAINED IN THE EXHAUST GASES OF PREDOMINANTLY ALCOHOL FUELED INTERNAL COMBUSTION ENGINES, A PROCESS FOR ITS PREPARATION, AND USES

INTRODUCTION AND BACKGROUND

The present invention relates to a catalyst to eliminate the noxious substances such as aldehydes, contained in the exhaust gases of predominantly alcohol fueled internal combustion engines. In a further aspect, the present invention relates to a process for preparing a catalyst as set forth and uses thereof.

In view of increasing energy shortages on a worldwide basis, other fuels besides those obtained from petroleum distillates are being increasingly proposed for use in operating internal combustion engines. Illustratively methanol prepared by the gasification of coal, or ethanol, prepared by fermenting biomasses or sugar canes and subsequent distillation, have already been successfully used in many countries for some time.

While partial admixture of alcohols to the normal fuels for internal combustion engines up to a concentration of 15% by volume is widely known, several countries already have carried out conversions to pure alcohol engines which illustratively are fueled only with ethanol or methanol or predominantly with alcohol in such manner with only slight additions of gasoline.

The exhaust gases resulting from internal combustion engines fueled exclusively with gasoline contain aldehydes. However alcohol fueled internal combustion engines emit quantities of aldehydes which are orders of magnitude higher. But high aldehyde concentrations in the ambient atmosphere lead not only to disagreeable odors, and to irritation of the mucous membranes, but furthermore, whether in the presence or absence of nitrogen oxides, the aldehydes may be photo-oxidized with formation of phyto-toxic substances.

Illustratively the so-called PAN (peroxiacetylnitrate $CH_3CO_2ONO_2$), is a compound mainly responsible for the Los Angeles smog and is generated from acetaldehyde, oxygen and nitrogen pentoxide ($N_2O_5$).

Whereas tested technology already does exist to eliminate the noxious substances which are carbon monoxide, hydrocarbons and nitrogen oxides, effective control of the aldehydes in the exhaust gases of alcohol fueled engines is less developed by current technology.

It was found especially with base metal catalysts such as those based on copper-chromium oxide that these base metal catalysts increase rather than decrease the proportion of the aldehydes when used for the treatment of exhaust fumes of an alcohol fueled engine.

Catalysts are known from the British patent documents A 2 005 149 and A 2 036 585 which consist of a matrix comprising continuous channels along a main axis and composed of flat and corrugated layers of high temperature resistant and non-scaling steel, or of a steel with a suitably resistant surface and arranged alternatingly so as to form a stack or a spirally wound body. These layers are coated with an aluminum oxide of the transition series, and the resulting coating itself is coated with a top coating of noble metals. These catalysts are suitable to purify the exhaust gases of internal combustion engines.

The European patent No. 0 075 124 discloses a catalyst for the combustion of noxious substances contained in the exhaust gases from alcohol fueled internal combustion engines. These catalysts are formed from a matrix with continuous channels along a main axis and consisting of flat and corrugated layers of high temperature resistant and non-scaling steel or of a steel with such a surface, where the layers are mounted alternatingly as a stack or are spirally wound. The layers are coated with a coating of an aluminum oxide of the transition series which may contain from 0.5 to 40% by weight of one or more earth alkali metals and/or rare earth metals in the oxide form. Palladium, as the noble metal, is then deposited on top of said coating in amounts of 0.03 to 3% by weight based on the total weight of the coating.

It has been found that this catalyst needs improvement because it was not completely satisfactory in converting the noxious substances and in start-up behavior when used as a three-way catalyst.

SUMMARY OF THE INVENTION

Applicants have found in surprising manner that palladium jointly with an aluminum oxide of the transition series that may be optionally lattice-stabilized offers good results when converting aldehydes, alcohols and other contaminations contained in the exhaust gas from internal combustion engines fueled predominantly with alcohol when these catalyst components additionally contain one or more rare earth metal oxides in conjunction with molybdenum silicide. In carrying out the invention, applicants have determined that these catalyst ingredients need not be deposited only on a metallic structural support in the form of a temperature and corrosion resistant matrix permeable to gas but they can also be in the form of bulk or pellet catalysts. They contain a rare earth metal in oxide form and molybdenum silicide, for example 0.5 to 40% by weight of cerium oxide and 0.5 to 30% by weight molybdenum silicide, these proportions each being in relation to the weight of aluminum oxide.

A feature of the present invention resides in a catalyst which is capable of eliminating noxious substances contained in the exhaust gases of predominantly alcohol fueled internal combustion engines and formed of an aluminum oxide of the transition series as the support, said aluminum oxide containing one or more rare earth metals in oxide form and palladium in proportions of 0.03 to 3% by weight relative to the total weight of the aluminum oxide, wherein the catalyst contains from 0.5 to 70% by weight of the rare earth metal oxide component and 0.5 to 30.0% by weight of molybdenum silicide ($MoSi_2$) each referred to the weight of aluminum oxide. The aluminum oxide can be in the form of a molded or shaped article for a particulate bed catalyst or as a coating on a monolithic or a honeycomb ceramic or metal support.

In a more detailed aspect of the invention, the aluminum oxide of the transition series is lattice-stabilized with the oxides of calcium, strontium, barium, zirconium or cerium and/or combinations of La-Nd, La-Nd-Ce or La-Nd-Pr-Ce which always are present as a mixture of the individual element oxides.

A variety of monolithic or honeycomb support products can be used. Typically such products exhibit cell density of 31 to 124 cells/$cm^2$. Generally the monolithic or honeycomb supports consist of a combination of flat and corrugated layers of a high temperature resistant and non-scaling steel or of a steel with a correspondingly resistant surface. The layers can be arranged alternatingly into a stack or wound into a spiral, the flat and/or the corrugated layers consisting of perforated sheet metal or sieve screens. More particularly the monolithic or honeycomb support consists of a ferritic chromium steel containing aluminum and exhibiting a strongly adhering skin of aluminum oxide. A carbon steel coated with an Al-Fe diffusion layer is particularly useful.

Another feature of the invention resides in a process for preparing a catalyst as described herein the form of a bulk or pellet form wherein a shaped and optionally lattice stabilized mixture of $Al_2O_3$ and $MoSi_2$ is impregnated in the weight ratio of 100 : 0.1-15 with a salt solution of the particular rare earth metal and then is dried and calcined at 250°-750° C. in air for 30 to 180 minutes. The resulting dope shaped articles then are impregnated with an aqueous solution containing a palladium salt and dried. Thereafter, they are heated to 250°-650° C., preferably 400°-500° C., in order to activate, in an oxidizing and/or reducing atmosphere, for example, in the flow of the exhaust gas being purified.

In an alternate embodiment, a catalyst of the invention is provided using a monolithic or honeycomb support which is coated with a dispersion of the optionally lattice-stabilized aluminum oxide and of the molybdenum silicide to produce a coating of the two substances. The rare earth metal oxide is then introduced into the coating by impregnation using a salt solution of the rare earth metal, drying and then calcination at 250°-750° C. in air for 30 to 180 minutes. As a variation of this process the monolithic or honeycomb support is brought into contact with combined dispersions of the molybdenum silicide and active aluminum oxide pre-loaded in known manner with rare earth metal oxide and optionally lattice-stabilized, and is thereafter dried and calcined in air for 30 to 180 minutes at 250°-750° C. Thereafter it is impregnated with an aqueous solution containing a palladium salt and next is dried again and lastly the catalyst is activated or made ready for use by heating to temperatures of 250-650, preferably 400°-500° C. in an oxidizing and/or reducing atmosphere or in the flow of the exhaust gas being purified.

In a further detailed aspect of this variation of the process for preparing the catalyst of the invention, the mixture of $Al_2O_3$ and $MoSi_2$ in the state of a formed bulk product, such as pellets, or as a coating on the monolithic or honeycomb support is treated by contacting with a solution containing the salts of all additives (rare earth metals, palladium). Following drying, the catalyst is finished by the heating conditions set forth above. For example, in the case of a matrix consisting of ferritic chromium steel containing aluminum it is calcined in air for 1-4 hours at 800 to 1,000° C. before the active aluminum oxide wash coat is deposited. Preferably, the matrix is formed of carbon steel coated with aluminum and this composite material is exposed at least 1 minute to a temperature between 600 and 1,200° C. before the active and possibly lattice-stabilized aluminum oxide and the molybdenum are applied.

More specifically, for purposes of lattice stabilization, the aluminum oxide of the transition series is mixed with a salt or an oxide of one or more earth alkali metals, of zirconium and/or rare earth metals and then is heated 0.5 to 3 hours at 600 to 1,000° C. before being deposited on the matrix.

BRIEF DESCRIPTION OF THE DRAWINGS

The present invention will be further understood with reference to the drawings wherein:

FIGS. 1 to 10 are a series of charts showing the relationships between degree of conversion and change in the value for lambda given for a variety of catalyst formulations, as described in greater detail herein.

DETAILED DESCRIPTION OF THE INVENTION

Figure 1:
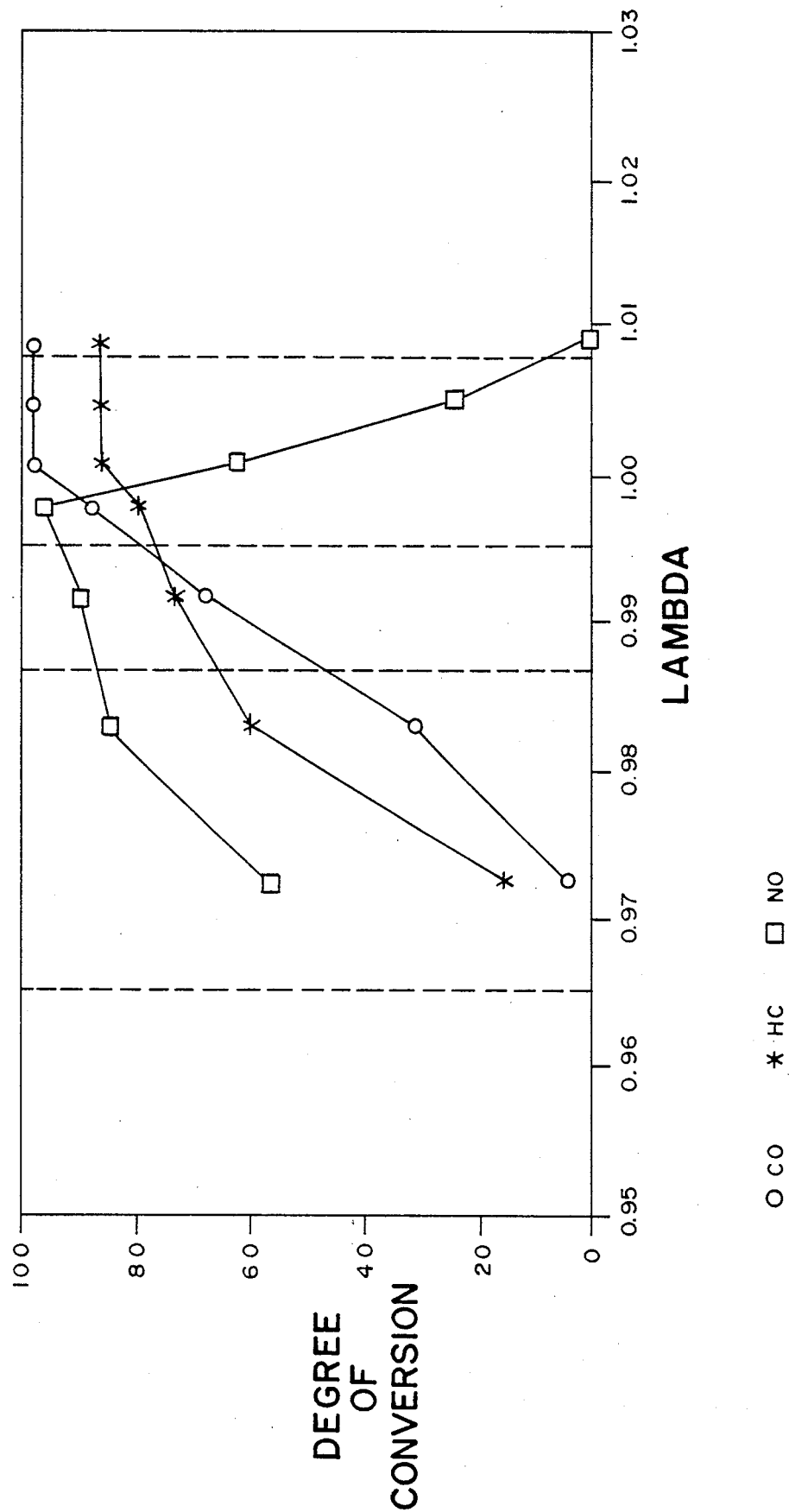

The honeycomb metal support used in accordance with the invention can be made from alternatingly mounted corrugated and flat, high temperature and corrosion resistant, non-scaling sheetmetal. It may also consist of alternatingly superposed flat and corrugated layers of correspondingly resistant steel, one layer of corrugated sheetmetal alternating with one layer of flat sieve screen, or of one layer of flat sheetmetal and one layer of corrugated sieve screen, or one layer of corrugated sieve screen with one layer of flat sieve screen. Perforated sheetmetal also can be used in lieu of the sieve screen.

The metal support layers can be stacked or be wound into a cylindrical, oval, rectangular or polygonal spiral. The corrugated layer may be shaped in a variety of ways. Advantageously it assumes the shape of a sinusoid or that of an involute, or is rectangular, square or trapezoidal.

To a large extent the effectiveness of catalysts with monolithic or honeycomb supports depends on the cell density. For the purposes of the invention, a cell density of 31 to 124 cells/cm² was found advantageous.

Suitable metals for the honeycombs are alloys of which the main components are iron, chromium, aluminum and which possibly also contain cerium and yttrium. The material is heated in an oxygenous atmosphere at such elevated temperature and for such time in order to achieve an adequate anchoring surface enabling a surface layer of aluminum oxide to be formed thereon from the aluminum in the alloy. Accordingly, a preferred embodiment mode of the invention provides that the honeycomb consists of a ferritic chromium steel containing aluminum and exhibiting a skin of strongly adhering aluminum oxide.

However the honeycomb metal also may be a plain carbon steel or plain cast iron coated with an aluminum-iron diffusion layer obtained by calcining aluminum coated steel or iron at high temperature. For these reasons of low costs, a specially preferred variation of the invention provides that the metal honeycomb consists of a carbon steel coated with an Al -Fe diffusion layer.

If a matrix consisting of a ferritic chromium steel containing aluminum is used, it is to be tempered in air for 1-4 hours at 800 to 1,000° C. to produce a rough, surface oxide layer improving adhesion. This tempering also may be applied earlier to the initial components of the honeycomb.

Where for reasons of economy a carbon steel honeycomb is used, it is to be coated for instance in a melt bath with aluminum, and this composite material is then exposed at least for 1 minute to temperatures between 600 and 1,200° C. Ordinarily heating times between 5 and 12 minutes are applied. A high temperature resistant, corrosion proof and non-scaling surface layer is obtained in this manner, essentially consisting of an aluminum iron alloy free of aluminum oxide but rich in aluminum, which is strongly fissured and therefore capable of adhering to coatings applied thereto. The production of the aluminum iron diffusion layer also can take place previously on the initial components of the honeycomb, that is, before it is assembled.

Suitable materials for ceramic monolithic honeycombs are cordierite, mullite and $\alpha$-$Al_2O_3$. Also suitable are $\gamma$-$Al_2O_3$ monoliths, in which case there is no need for a catalytically enhancing coating.

In a further implementation of the process of the invention, the catalyst service life can be extended substantially provided that the aluminum oxide of the transition series is lattice-stabilized. Accordingly, the invention provides that the active aluminum oxide be mixed prior to the deposition on the matrix with a salt or an oxide of one or more earth alkali metals, or zirconium dioxide and/or rare earth metals, and that thereupon this mixture be heated from 0.5 to 3 hours at 600 to 1,100° C. As a rule oxides of the elements or combinations of such oxides as calcium, strontium, barium, zircon and cerium can be used, and/or combinations of La—Nd, La—Nd—Ce, La—Nd—Pr—Ce as mentioned above.

Lastly the invention also covers the use of the catalyst described above in relation to the material and its preparation for the simultaneous elimination of aldehydes, alcohols such as ethanol and methanol, carbon monoxide, nitrogen oxides and hydrocarbons from the exhaust of internal combustion engines fueled wholly or predominantly with alcohols such as methanol and ethanol.

The catalyst of the invention offers a number of surprising advantages. Thus the catalyst composition of the invention provides the surprisingly low start up temperatures for the catalytic reaction and higher conversions, in particular for those aldehydes acting as conventional catalysts and based on platinum/palladium or palladium alone.

Moreover the aging properties of the catalyst are critically improved relative to those known catalysts.

The invention is illustrated below by means of Examples.

EXAMPLE 1

A catalyst denoted A contains palladium as the catalytically active component, this palladium being deposited in finely distributed manner on a honeycomb support made of a ferritic chromium steel (with 15% by weight Cr and 4.5% by weight Al, remainder Fe) and coated with $\gamma$-aluminum oxide. The $\gamma$-aluminum oxide is doped with 6% by weight $ZrO_2$ and with 5% by weight $CeO_2$ components. The palladium is present by 0.86% by weight based on the weight of the aluminum oxide.

A second catalyst denoted B contains the same amount of palladium as catalyst A but in addition molybdenum silicide ($MoSi_2$) as the active catalyst component.

The palladium is deposited in finely distributed form on the same aluminum oxide coated honeycomb that was used for catalyst A. The molybdenum silicide was introduced in powder form (particle size: 98% <20 microns) into the aqueous coating suspension containing $\gamma$-aluminum oxide and the same quantity of zirconium dioxide and cerium dioxide as catalyst A.

The finished catalyst B contains palladium in an amount of 0.86% by weight and 13.9% by weight $MoSi_2$ besides 6% by weight $ZrO_2$ and 5% by weight $CeO_2$ each in relation to the weight of the $\gamma$-aluminum oxide.

The three-way activity of catalysts A and B were determined at an engine test bench. The engine used was a 1.8 liter, 4-cylinder Otto engine fueled with a mixture of 95% by volume of water-free ethanol, 2% by volume lead-free gasoline and 3% by volume water. The space velocity during the test was 67,000/h, the temperature of the exhaust gas at the catalyst intake was 450° C.

Under these conditions, the three-way activity was determined in that the conversions of carbon monoxide, hydrocarbon and nitrogen oxides were determined as a function of the $\lambda$-value (lambda). The expression "hydrocarbons" in this respect must be understood to be the total amount of components that can be sensed by a flame ionization detector. Therefore the term "hydrocarbons" includes both compounds of carbon, hydrogen and oxygen, for instance ethanol. The $\lambda$-value corresponds to the ratio of the input quantities of air to fuel on one hand to the stoichiometric quantities of air to fuel on the other. When the $\lambda$-values are less than 1, the exhaust gas compositions are rich or reducing. When the $\lambda$-values are more than 1, the exhaust gas compositions are lean or oxidizing.

Figure 2:
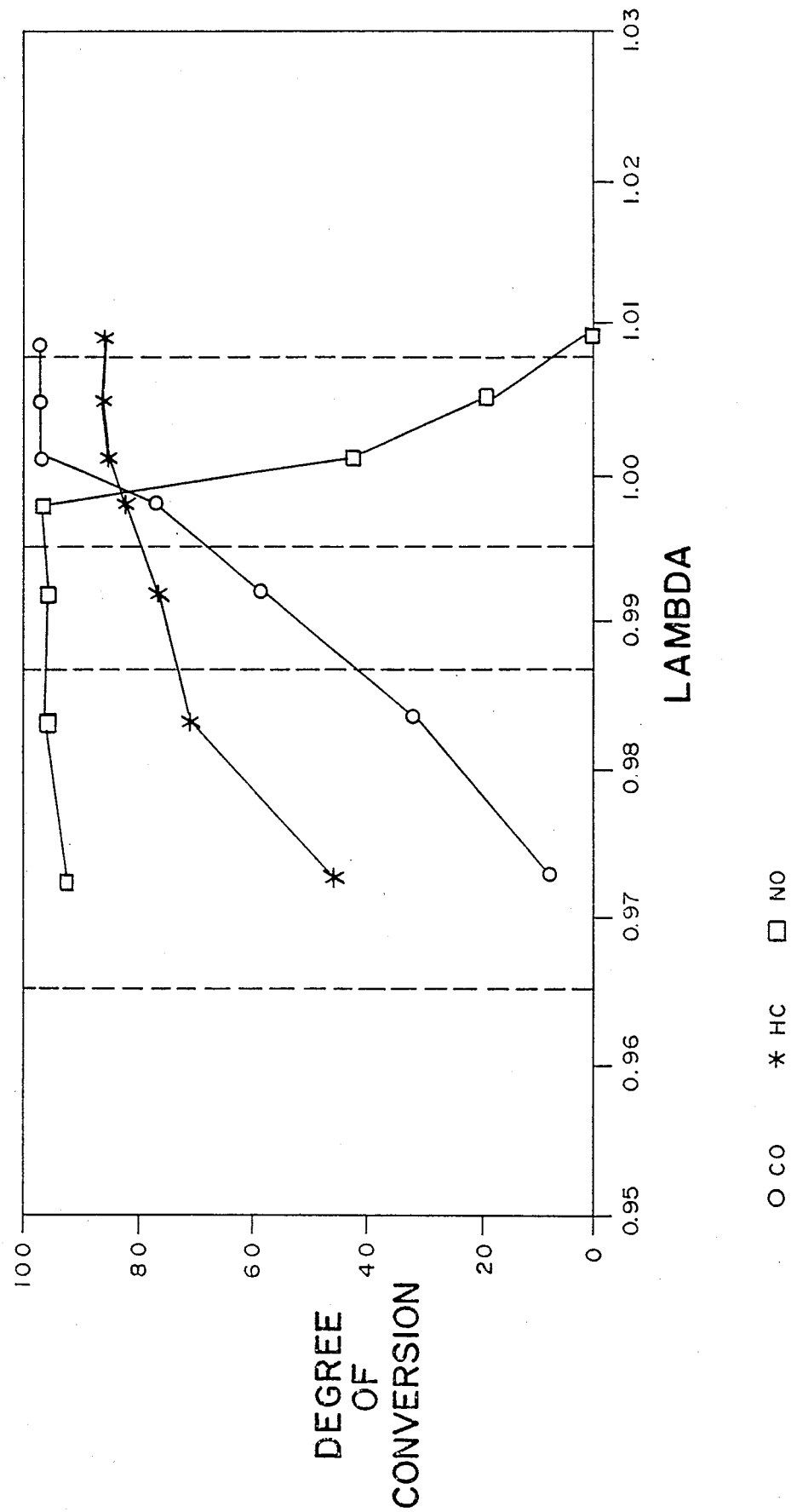

The catalysts A and B each were tested while fresh and following thermal aging in air for four hours at 750° C. FIGS. 1 and 2 show the results for the fresh catalysts. It will be noted that the addition of molybdenum silicide to the palladium catalyst improves the conversions both of the nitrogen oxides and of the hydrocarbons for rich exhaust gas compositions.

Figure 3:
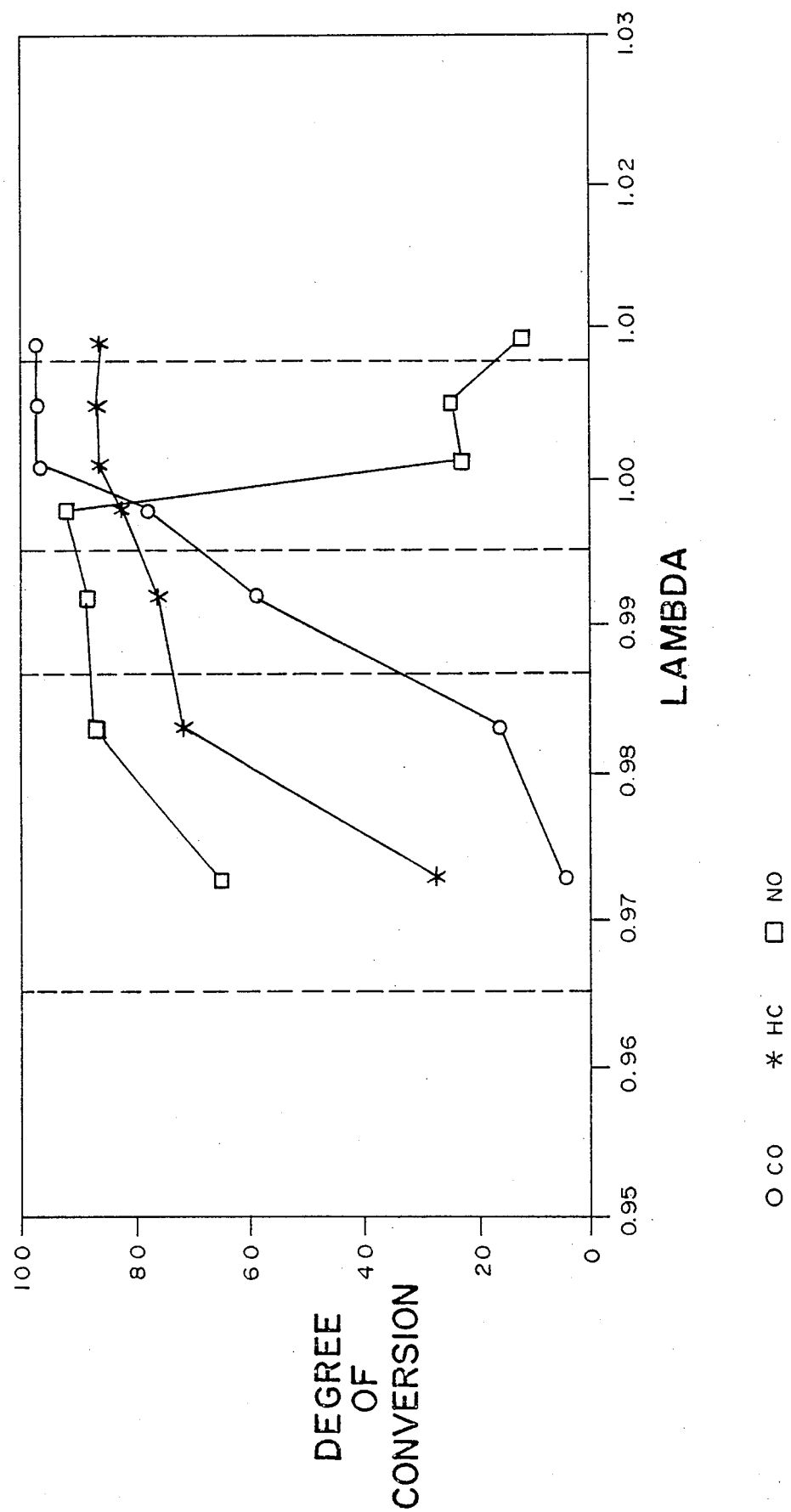
Figure 4:
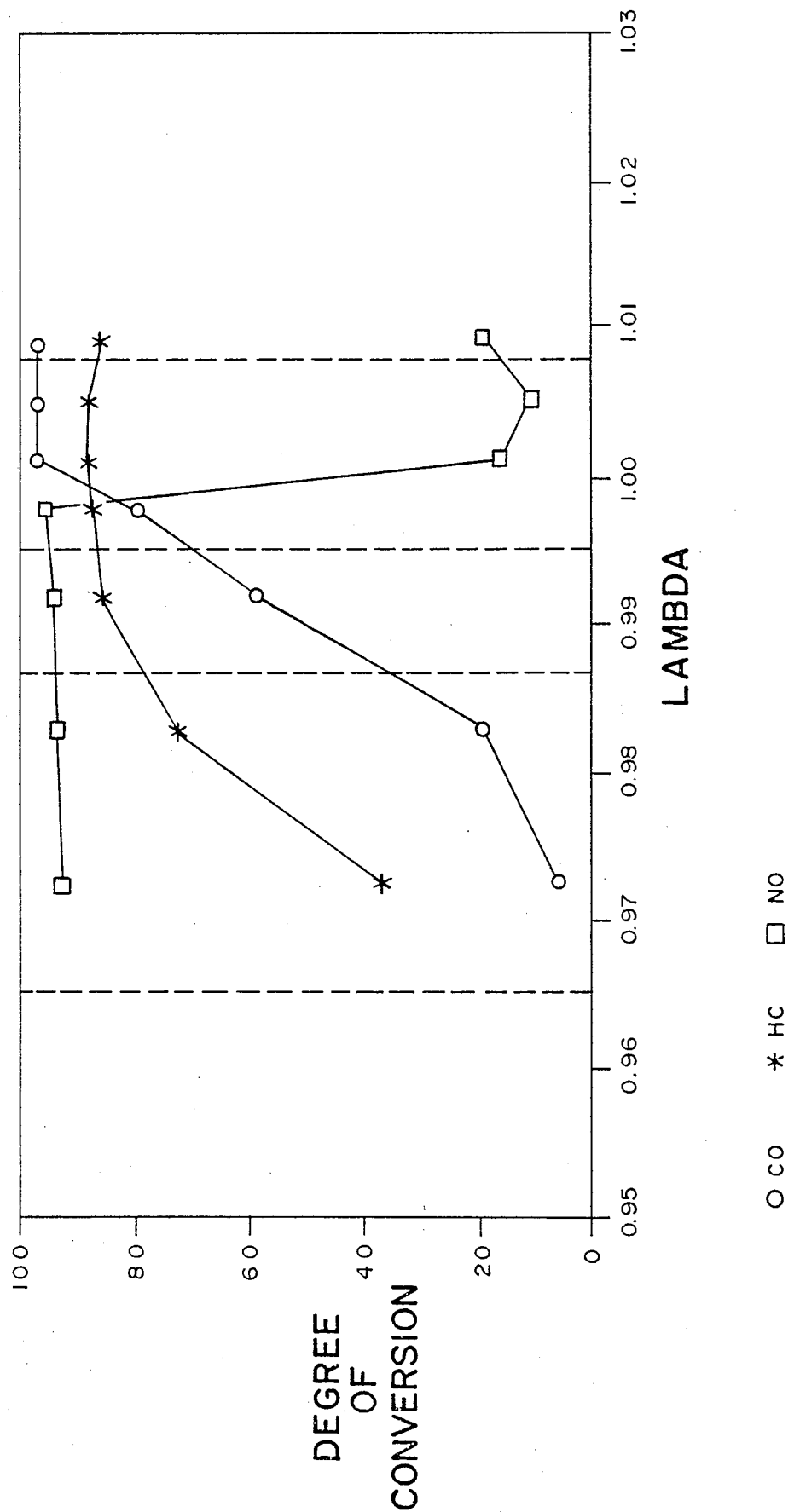

FIGS. 3 and 4 show the test results for the thermally aged catalysts. As shown, the advantageous effect of molybdenum silicide has been fully retained after that aging.

EXAMPLE 2

To provide the advantageous effect of the addition of molybdenum silicide to a palladium catalyst, three more catalysts were prepared and tested.

Catalyst C contains only palladium as the active catalytic component. This catalyst is very much like catalyst A described in Example 1 except for a higher proportion of the oxygen storing component, 60% by weight $CeO_2$ and a lower proportion of $ZrO_2$, namely 3% by weight, each instance in relation to the weight of the aluminum oxide. The palladium content of this catalyst was 1.4% by weight based on the weight of the $\gamma$-aluminum oxide.

Catalyst D contains palladium and molybdenum silicide as the active catalytic components. The palladium is deposited in a finely distributed state on the same catalyst combination as in Example (metal support with a wash coat).

The molybdenum silicide was added as a powder with a particular size <20 microns to the aqueous suspension of the aluminum oxide. The same lattice-stabilized $\gamma$-aluminum oxide with the same proportions of $CeO_2$ and $ZrO_2$ as in catalyst C was used; molybdenum silicide was present in a proportion of 11.0% by weight relative to the weight of the aluminum oxide.

The finished catalyst D contained 1.40% by weight palladium, 11.0% by weight molybdenum silicide, 60% by weight cerium dioxide and 3% zirconium dioxide, each in relation to the weight of aluminum oxide.

Another catalyst, denoted by E, contained palladium and molybdenum trioxide ($MoO_3$) as the catalytically active components. The palladium was deposited in finely distributed manner on the same metal honeycomb onto which previously a γ-Al₂O₃ washcoat containing 60% by weight CeO₂ and 3% by weight ZrO₂ and then a conventional molybdenum compound had been deposited. In this instance the molybdenum was introduced in the form of an aqueous ammonium heptamolybdate solution. The washcoat consisted of the same stabilized and CeO₂-doped γ-aluminum oxide as in catalyst C, the same proportions being present as in catalyst C. It must be borne in mind in this regard that the quantity of the CeO₂ is about six-fold that required to react with molybdenum trioxide with formation of stable cerium molybdate.

The finished catalyst E contained 1.40% by weight palladium, 14.0% by weight molybdenum trioxide, 60% by weight cerium dioxide and 3.0% by weight ZrO₂ in each instance in relation to the weight of the aluminum oxide.

The three-way activity and the start up behavior of catalysts C, D and E were determined in the same manner at the engine test bench as in Example 1.

The three-way activity of the catalysts was determined at a space velocity of 67,000/h and at 450° C. catalyst entry temperature by plotting the conversions of carbon monoxide, nitrogen oxide and hydrocarbons as a function of the λ-value.

The start up behavior of the catalysts was determined at the above space velocity both for lean and rich exhaust gas compositions (λ=1.02 and 0.984 resp.) by plotting the conversions of carbon monoxide, nitrogen oxides and hydrocarbons as a function of the catalyst entry temperature.

The three-way activity and the start up behavior were determined each for fresh, hydrothermally aged and engine aged catalysts. Hydrothermal aging is more rigorous than the aging conditions of Example 1 in order to assure that the catalytic activity also be present under extreme driving conditions. This aging took place in a flow of 90% by volume nitrogen and 10% by volume water for 4 hours at 985° C.

Engine aging of the catalysts was carried out for 85 hours on a 1.8 liter, 4-cylinder ethanol engine at 3,500 rpm and 35 kw braking power. The exhaust-gas composition was stoichiometric (λ=1.0), and the exhaust-gas flow corresponds to a space velocity of 160,000 liters of gas per hour-liter of catalyst volume; the temperature of the exhaust gas was 700° C. at catalyst entry. These conditions approximately match driving 20,000 km.

Figure 5:
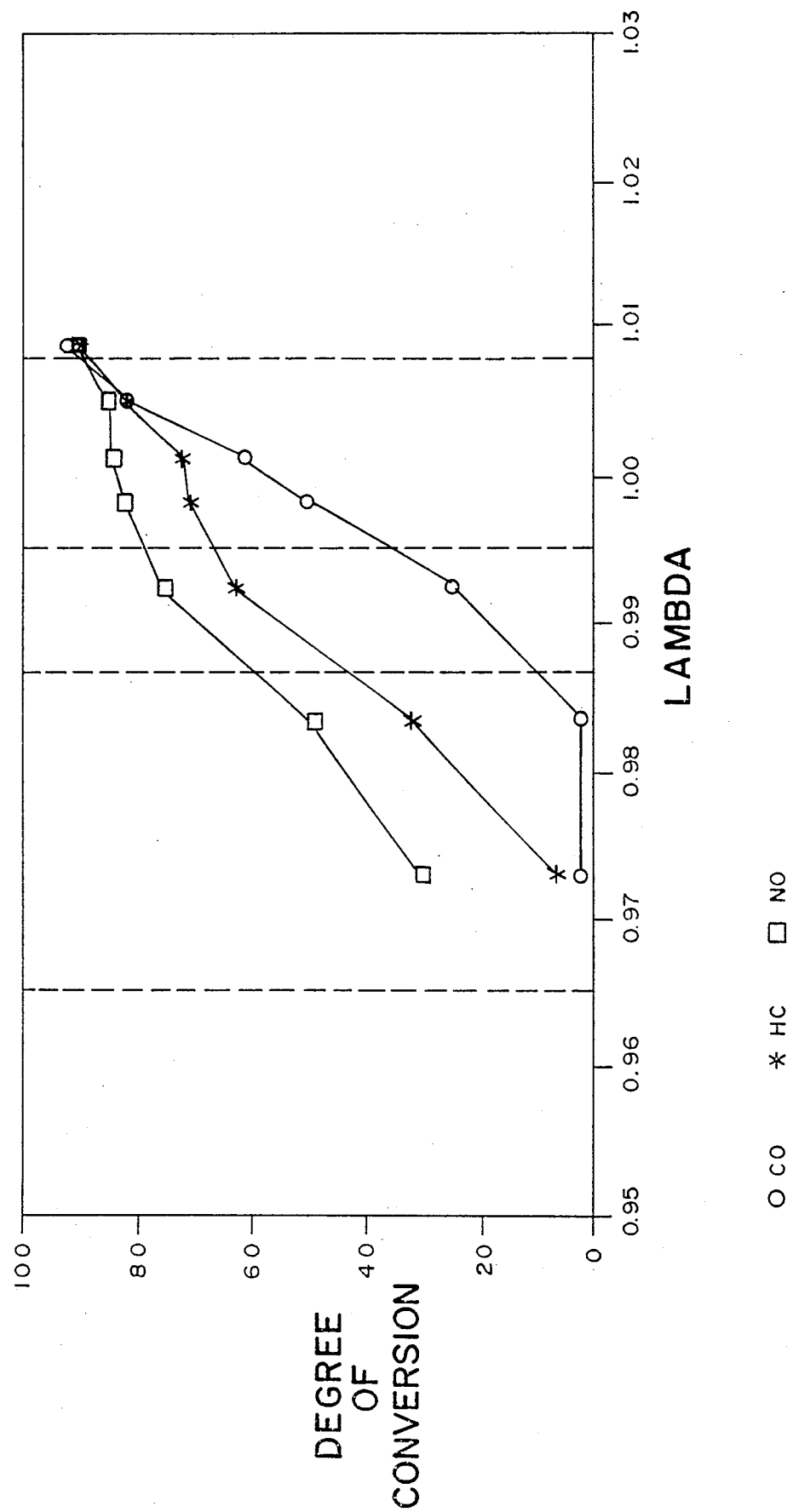
Figure 6:
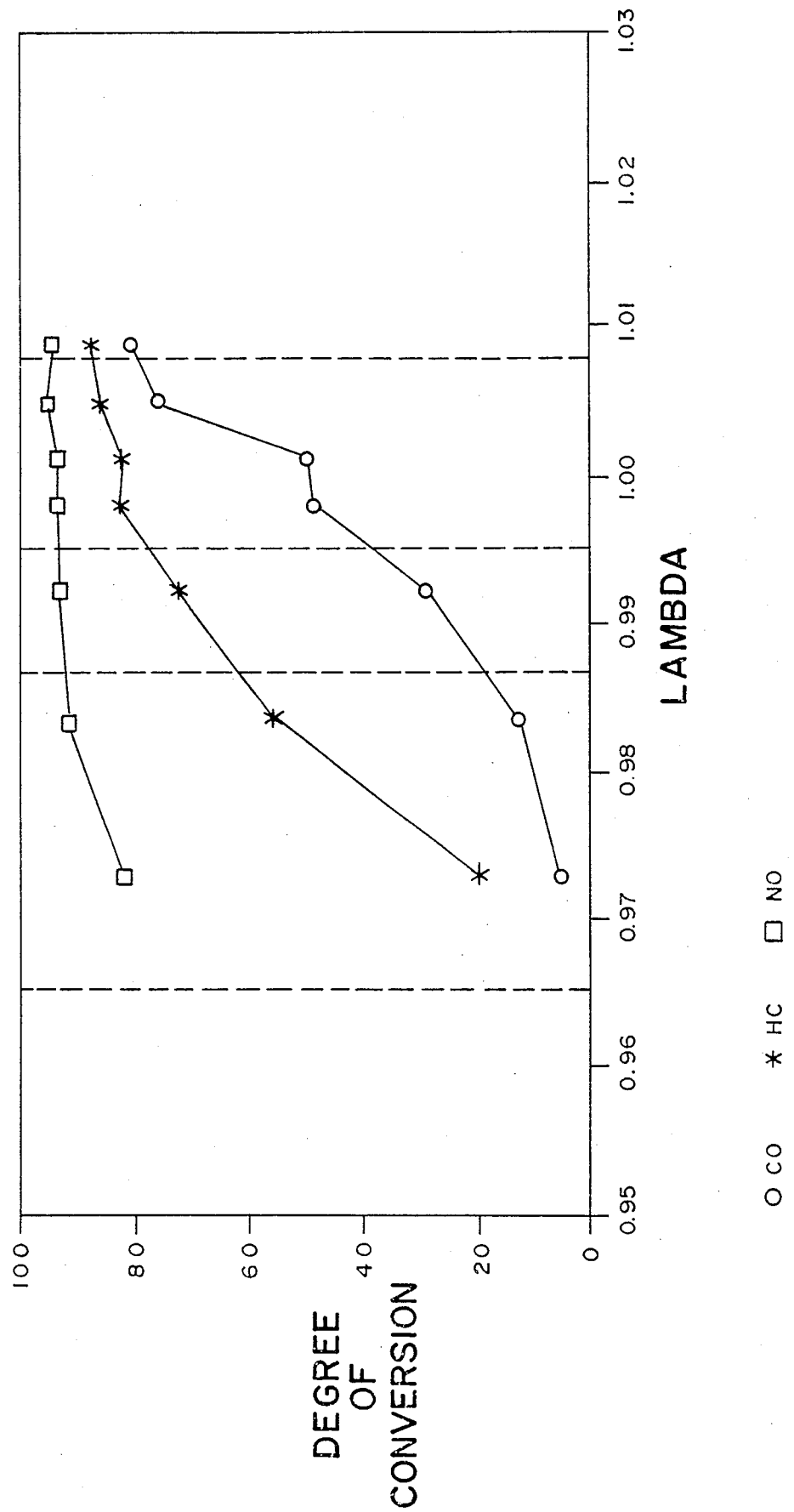
Figure 7:
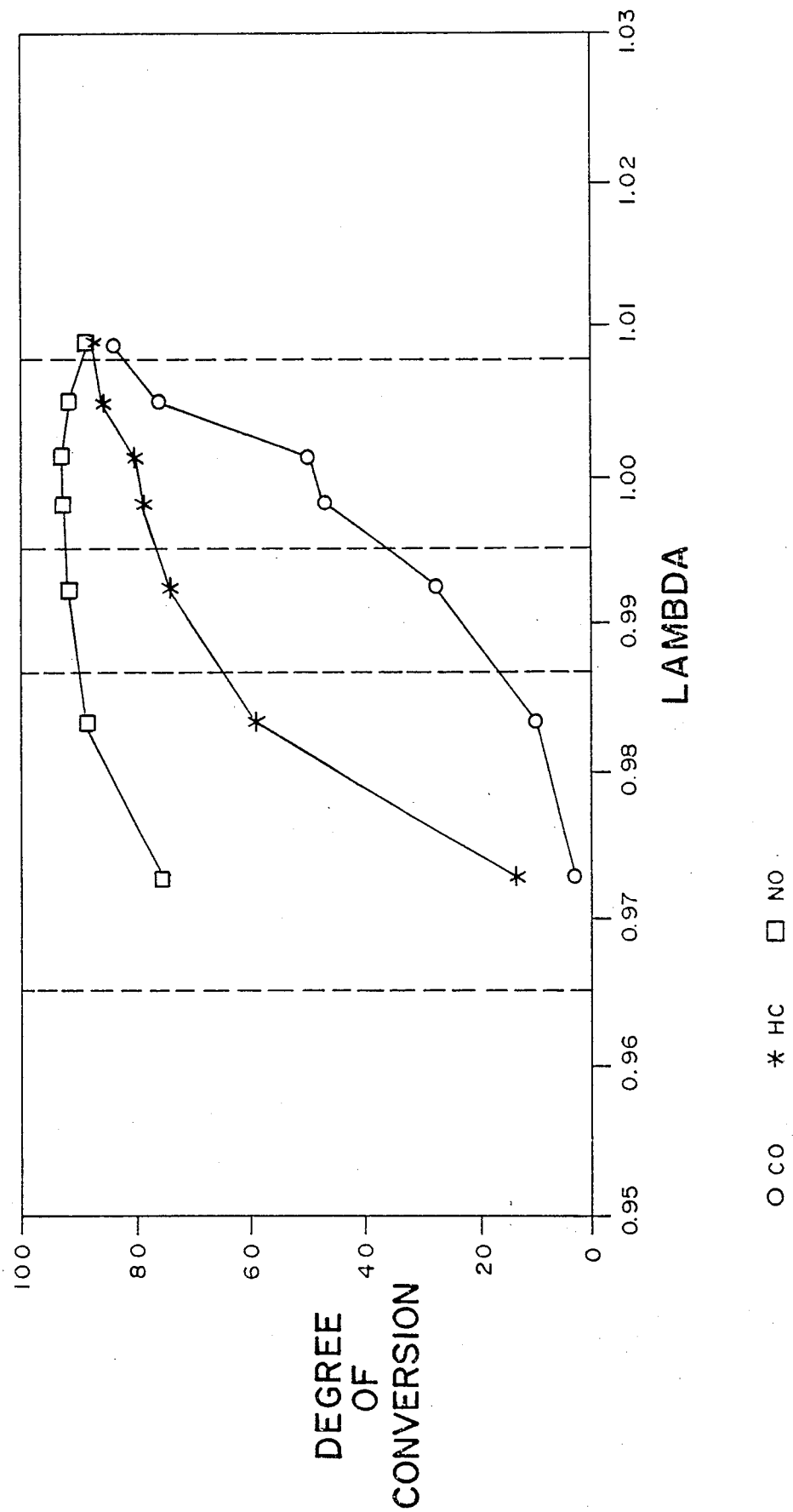

FIGS. 5, 6 and 7 show the test results for the three-way activity for the hydrothermally aged catalysts C, D and E.

These Figures show that both catalysts D and E offer far better conversion for nitrogen oxides and hydrocarbons in the case of rich exhaust gas compositions than the catalyst C free of molybdenum silicide and molybdenum trioxide.

The results from the hydrothermally aged catalysts C, D and E for the start up tests clearly prove the advantageous effect of using molybdenum silicide with catalysts containing palladium/rare earth oxides.

As shown by Table 1, the temperature at which 50% of the nitrogen oxides can be eliminated is lower by 30° C. for the catalyst D than for catalyst C and 85° C. lower than for catalyst E.

TABLE 1

| Catalyst | λ = 0.984 50% conversion NO$_x$ | λ = 1.020 temperatures (°C.) | |
|---|---|---|---|
| | | CO | HC |
| C | 307 | 275 | 320 |
| D | 272 | 292 | 322 |
| E | 357 | 307 | 337 |

Figure 8:
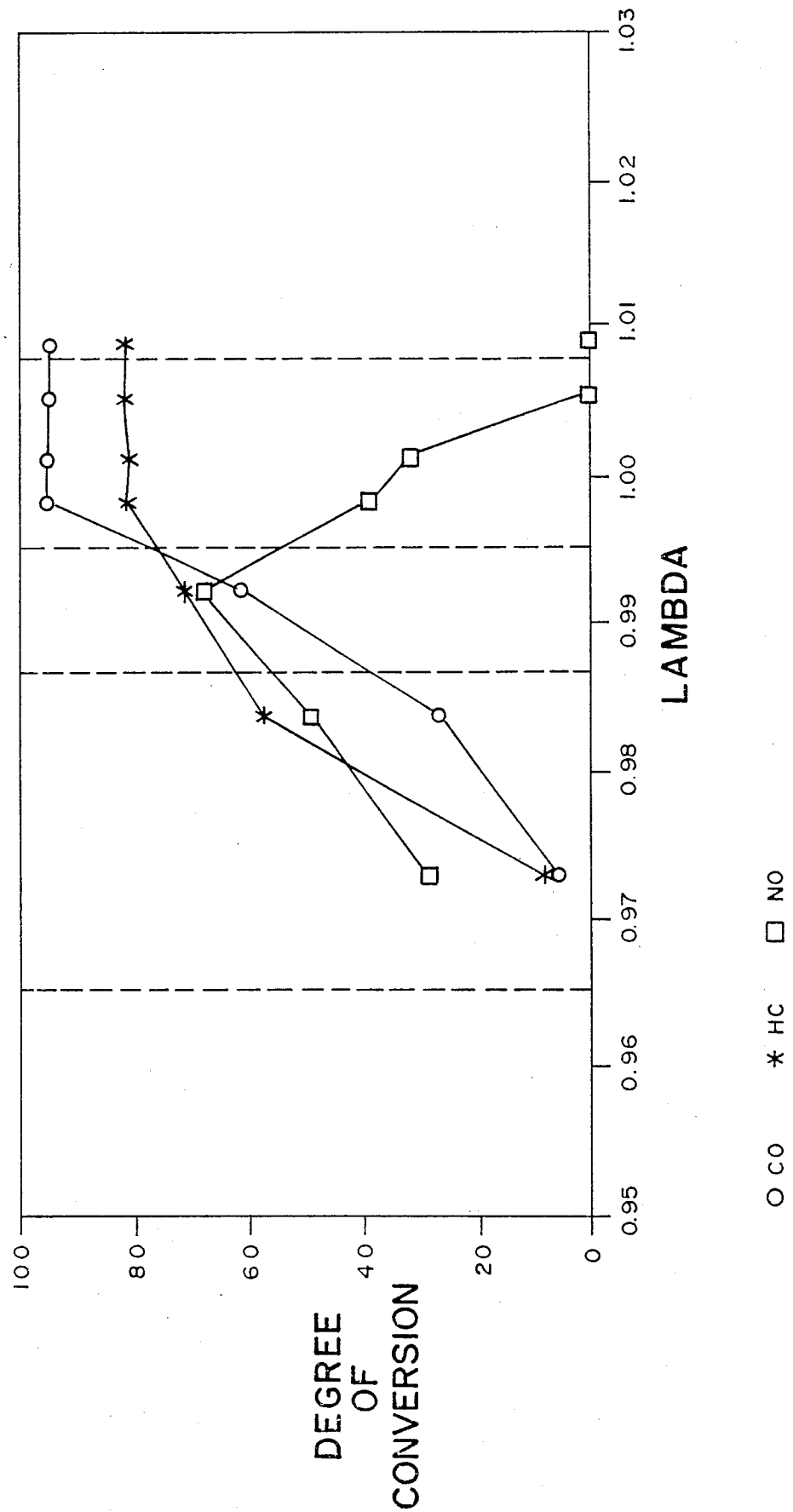
Figure 9:
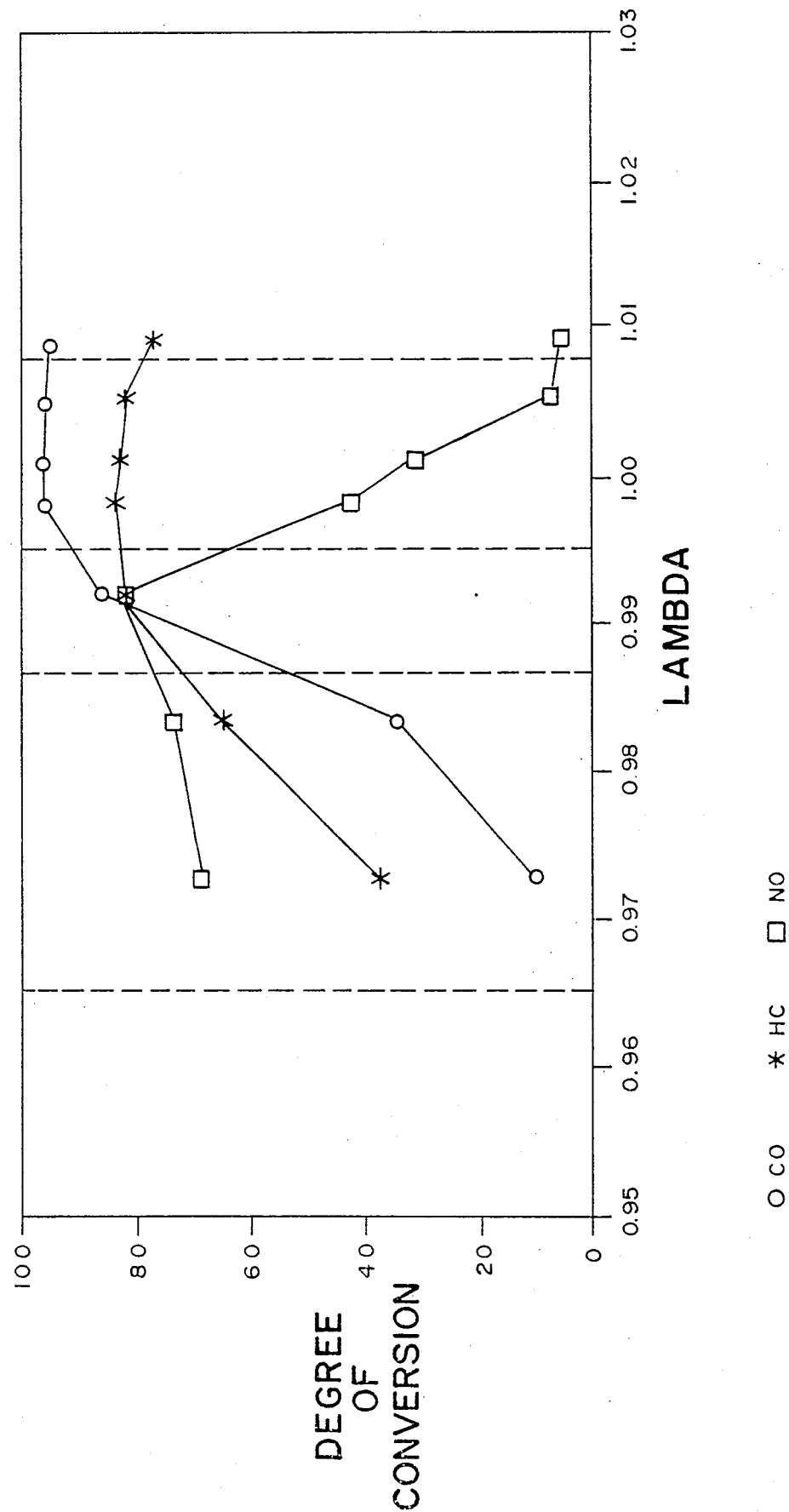

Start up behavior of the hydrothermally aged catalysts C, D and E for rich and lean exhaust gas compositions FIGS. 8, 9 and 10 show the results from the three-way activity on the engine aged catalysts C, D and E. These figures show that the conversion of the hydrocarbons and the nitrogen oxides is substantially improved for rich and stoichiometric exhaust gas compositions at the engine aged catalyst D than the engine aged catalysts C and E.

Furthermore, the temperatures at which 50% of the nitrogen oxides are converted are clearly lower with the catalyst D than for the catalysts C and E as indicated in Table 2.

TABLE 2

| Catalyst | λ = 0.984 50% conversion NO$_x$ | λ = 1.02 temperature (°C.) | |
|---|---|---|---|
| | | CO | HC |
| C | 450 | 245 | 275 |
| D | 345 | 250 | 290 |
| E | 450 | 250 | 285 |

Start up behavior of engine aged catalysts C, D and E for rich and lean exhaust gas compositions The conversion of the aldehydes was also measured for the engine aged catalysts C, D and E at an exhaust gas temperature 450 ° C. in front of the catalyst, with λ=0.998 and 67,000 liters of gas/liter of catalyst-hour.

As shown by Table 3, the conversion of the aldehydes at the engine aged catalyst D is somewhat higher than at the engine aged catalyst E and substantially higher than at engine aged catalyst C.

TABLE 3

| Catalyst | Aldehyde conversion |
|---|---|
| C | 72% |
| D | 94% |
| E | 87% |

Conversion of the aldehydes at the engine aged catalytsts (450° C.; λ = 0.998; space velocity: 67,000 liters of gas/liter of catalyst volume-h).

In summary, the tests show it is possible to substantially improve both catalyst performance and aging stability by adding molybdenum silicide instead of conventional molybdenum compounds and that both the performance and aging stability of molybdenum free catalysts are substantially lower than for catalysts containing molybdenum.

Further variations and modifications of the invention will be apparent to those skilled in the art from the foregoing and are intended to be encompassed by the claims appended hereto.

German priority application P 38 30 317.5 is relied on and incorporated herein by reference.

We claim:

1. A catalyst to eliminate noxious substances contained in the exhaust gases of predominantly alcohol fueled internal combustion engines, comprising a support of an aluminum oxide of the transition series and 0.5 to 30.0% by weight of molybdenum silicide (MoSi₂) based on the weight of aluminum oxide, said aluminum oxide support having one or more rare-earth metals in oxide form deposited thereon in the amount of from 0.5 to 70% by weight based on the weight of aluminum oxide and further having deposited on said support palladium in proportions of 0.03 to 3% by weight relative to the total weight of the aluminum oxide.

2. The catalyst according to claim 1, wherein the aluminum oxide is present in the form of a molded or shaped article or as a coating on a monolithic or a honeycomb ceramic or metal support.

3. The catalyst according to claim 1, wherein the aluminum oxide of the transition series is lattice-stabilized with an oxide of calcium, strontium, barium, zirconium or cerium or with combinations of La—Nd, La—Nd—Ce or La—Nd—Pr—Ce which are present as a mixture of the individual element oxides, or mixtures thereof.

4. The catalyst according to claim 2 wherein the monolithic or honeycomb support has a cell density of 31 to 124 cells/cm$^2$.

5. The catalyst according to claim 4, wherein the monolithic or honeycomb support consists of flat and corrugated layers of a high temperature resistant and non-scaling steel or of a steel with a correspondingly resistant surface, said layers being arranged alternatingly into a stack or wound into a spiral, the flat, the corrugated layers, or both consisting of perforated sheetmetal or sieve screens.

6. The catalyst according to claim 2 wherein the monolithic or honeycomb support consists of a ferritic chromium steel containing aluminum and having an adhering skin of aluminum oxide.

7. The catalyst according to claim 2 wherein the monolithic or honeycomb support consists of a carbon steel coated with Al -Fe diffusion layer.

8. A process for preparing a catalyst to eliminate noxious substances contained in the exhaust gases of predominantly alcohol fueled internal combustion engines, comprising: providing a shaped catalyst support formed of a mixture of $Al_2O_3$ and $MoSi_2$, said $Al_2O_3$ being optionally lattice-stabilized, impregnating said shaped support in the weight ratio of 100 : 0.1-15 with a salt solution of rare-earth metal, drying and calcining at 250°-750° C. in air for 30 to 180 minutes, thereafter impregnating the shaped support with an aqueous solution containing a palladium salt and drying said impregnated support.

9. The process according to claim 8 which further comprises heating said shaped support having the palladium deposited thereon to 250 to 650° C. to activate the catalyst.

10. The process according to claim 9 wherein said heating is at 400°-500° C.

11. The process for preparing the catalyst as defined in claim 8 wherein the mixture of $Al_2O_3$ and $MoSi_2$ as a shaped support is contacted with a solution containing the salts of rare earth metal and palladium.

12. A process for preparing a catalyst to eliminate noxious substances contained in the exhaust gases of predominantly alcohol fueled internal combustion engines, comprising: providing a monolithic or honeycomb support, coating said support with a dispersion of aluminum oxide or lattice-stabilized aluminum oxide and of molybdenum silicide to produce a coating of the aluminum oxide and molybdenum silicide, depositing rare-earth metal oxide into said coating by impregnating with a salt solution of rare-earth metal, drying and tempering at 250°-750° C. in air for 30 to 180 minutes, or impregnating said support with combined dispersion of the molybdenum silicide and active aluminum oxide and rare-earth metal oxide to form a coating on said support, drying the coating so produced and calcining in air for 30 to 180 minutes at 250°-750° C. and then impregnating with an aqueous solution containing a palladium salt and drying said impregnated support.

13. The process according to claim 12 further comprising heating the catalyst, after said impregnation with an aqueous solution containing a palladium salt, to temperatures of 250°-650° C. in an oxidizing or reducing atmosphere or in the presence of the exhaust gas being purified.

14. The process according to claim 13 wherein the temperature is 400 to 500° C.

15. The process for preparing the catalyst as defined in claim 11 wherein the support is contacted with a solution containing the salts of rare earth metals and palladium.

16. The process defined in claim 11 wherein a matrix consisting of ferritic chromium steel containing aluminum is calcined in air 1–4 hours at 800 to 1,000° C. before the active aluminum oxide is deposited.

17. The process defined in claim 12, wherein a matrix consisting of carbon steel is coated with aluminum and is exposed at least 1 minute to a temperature between 600 and 1,200° C. before the aluminum oxide component and the molybdenum silicide are deposited.

* * * * *